United States Patent Office 3,351,613
Patented Nov. 7, 1967

3,351,613
COPOLYMERS HAVING POLYOXYMETHYLENIC STRUCTURE AND A PROCESS OF PREPARING SAME
Giulio Natta, Gianfranco Pregaglia, and Giorgio Mazzanti, Milan, and Marco Binaghi, Varese, Italy, assignors to Montecatini Edison S.p.A., Milan, Italy, a corporation of Italy
No Drawing. Filed Dec. 12, 1963, Ser. No. 336,333
Claims priority, application Italy, Dec. 13, 1962, 24,331/62
11 Claims. (Cl. 260—64)

This invention is directed to the preparation of polymers having a high-thermo stability and more specifically to copolymers having a prevailingly polyoxymethylenic structure. Still more specifically, this invention is directed to a process of preparing copolymers having a polyoxymethylenic structure by using a Lewis-acid type catalyst.

Polymers having reoccurring $CH_2O$ units have been known and can be prepared by polymerizing formaldehyde or trioxane. However, trioxane-dimethylketene copolymers prepared with Lewis-acid catalysts are new and are the subject of this invention. In U.S. patent application Ser. No. 265,584, filed on Mar. 11, 1963, now abandoned high molecular weight linear copolymers whose macromolecules consist of monomeric units of:

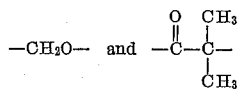

have been disclosed. These copolymers were prepared by polymerizing anhydrous formaldehyde with dimethylketene in the presence of a catalyst selected from the Lewis bases such as the tertiary amines.

It has now been discovered, quite unexpectedly, that these copolymers can be prepared with trioxane in the presence of a catalyst selected from the Lewis acids. More specifically, it has been discovered that by using a Lewis-acid catalyst, polymers having macromolecules consisting of oxymethylenic units and units derived from dimethylketene can be obtained. These polymers can be characterized as being polymerized in the presence of a Lewis-acid catalyst from a mixture of (1) trioxane and dimethylketene or (2) trioxane and an addition product of one mole of dimethylketene and one mole of formaldehyde. The polymers obtained from the process of this invention have macromolecules consisting of:

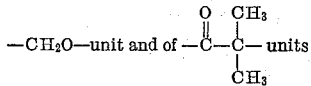

While it is known to be possible to use catalysts of the Lewis acid type for the polymerization of trioxane, it could not be foreseen that dimethylketene would copolymerize with trioxane in the presence of these catalysts. This copolymerization was unexpected because in fact, it was known that in the presence of $BF_3$ or one of its coordinated complexes, dimethylketene by itself would not form high-molecular weight polymers, but on the contrary it would merely dimerize to tetramethyl cyclobutandione. However, now it has been found that in the presence of trioxane, dimethylketene will copolymerize to a polymer having a structure characterized as follows:

(1) 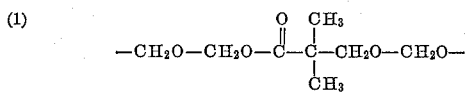

Accordingly, it is an object of this invention to provide a process for preparing copolymers having macromolecules consisting of oxymethylenic units and units derived from dimethylketene.

It is still another object of this invention to provide a process for preparing polymers having a high thermostability and more specifically, copolymers having a prevailingly polyoxymethylenic structure.

It is still another object of this invention to provide copolymers characterized as having a prevailingly polyoxymethylenic structure and being prepared in the presence of a catalyst selected from one of the Lewis acids.

These, and other objects of the invention will become obvious from a further and more detailed description.

Thus, it has now been discovered, quite unexpectedly, that by using a Lewis-acid catalyst, copolymers can be prepared from a mixture of trioxane and dimethylketene. More specifically, it has been discovered that these copolymers can be prepared in the presence of a Lewis-acid catalyst from a mixture of trioxane and an addition product obtained from one mole of dimethylketene and one mole of formaldehyde.

While any of the catalysts known to be used for the polymerization of trioxane may be used in the process of this invention, it is preferred to use $BF_3$. In addition to $BF_3$, the coordination complexes of $BF_3$ with organic compounds wherein the donor atom is oxygen or sulfur may also be used. Specifically preferred as a catalyst is the $BF_3$-etherate, wherein the complex forming compound is ethyl ether. Another suitable catalyst is $FeCl_3$.

It was found that these catalysts must be present in the polymerization medium in a molar concentration ranging from about 0.001 to 1.0 and more preferably from about 0.005 to 0.1 per mole of trioxane. The dimethylketene co-monomer should not be present in the reaction medium in an amount in excess of about 20 moles per 100 moles of trioxane, so as not to inhibit the polymerization reaction. More specifically, it is preferred to maintain the trioxane/dimethylketene ratio in the polymerization medium ranging from about 10 to 1000.

If in place of the dimethylketene, the addition product of one mole of dimethylketene and one mole of formaldehyde, namely pivalolactone, is to be used as the co-monomer then the trioxane/pivalolactone molar ratio may range from about 1000 to 2. In this case it is preferred, however, to use a molar ratio ranging between 100 and 10 so as to avoid modifying the mechanical properties of the polymer which are characteristic of the polyoxymethylenic structure. Also if pivalolactone is used as the monomer in order to obtain more homogeneous product it is possible to dissolve the trioxane in an organic solvent. Here the catalyst is added to the solution so as to obtain a more homogeneous product. Likewise, good results can be obtained by continuously adding the lactone solution to a solution of the trioxane and catalyst. The solvents to be used to carry out a controlled polymerization reaction include cyclohexane, benzene, methylene chloride, etc.

The temperature of the reaction can vary from about 0° C. to 110° C. and more preferably from 25° C. to 70° C. with the reaction time ranging from about 3 minutes to 20 hours depending upon the conditions adopted. If desirable, the reaction may be carried out under pressures ranging from below atmospheric pressure up to about 100 atm. It is preferred, however, to operate under atmospheric pressure.

The copolymers obtained in accordance with the teachings of this invention have a structure consisting substantially of oxymethylenic sequences and of groups:

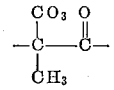

distributed at random in a ratio of about 6:1 to about 1000:1. These products are solid and have a melting point slightly lower than that of the corresponding polyoxymethylenic homopolymers. In most cases the copolymers of this invention have melting points ranging from about 150° C. to 175° C. These products are further characterized as having a very high stability after having been heat-treated at 160° C. so as to eliminate fraction of paraformaldehyde and unstabilized polyoxymethylene. These unstable fractions, however, do not exceed 20% by weight of the total product. In fact, it was found that the weight loss did not exceed 0.3% per minute at a temperature of about 225°C.±5° C.

The following examples illustrate the products and the process of preparing them in accordance with this invention.

EXAMPLE 1

Approximately 10 grams of trioxane which had been purified by distillation on a sodium-potassium alloy and 1 cc. of beta-pivalolactone in 40 cc. of anhydrous benzene were introduced together with 0.1 cc. of boron trifluoride into a flask provided with an agitator and a nitrogen inlet pipe.

The mixture was agitated for about 24 hours at room temperature and the precipitate obtained was filtered. The traces of catalyst were removed by suspending the polymer in an aqueous sodium carbonate solution. The polymer was then washed with water and finally with methanol.

After drying the polymer in air at 60° C., approximately 6.7 grams of the product were obtained. By heating the product at 160° C., it was found to lose originally about 10% of its weight. The remaining product lost only about 0.21% by weight per minute at 222° C. The product was not treated with any heat stabilizer. The pivalolactone content of the polymer was found to be about 10% by weight as calculated on the basis of the

band in the infrared absorption spectrum.

EXAMPLE 2

Approximately 5 cc. of anhydrous benzene and 0.05 cc. of boron trifluoride-etherate were introduced, under an inert gas, into a flask provided with an agitator, dropping funnel and a nitrogen inlet pipe. The flask was held in a bath at a temperature of 60° C. A solution of 10 grams of trioxane (purified by distillation on potassium) and 1 cc. of pivalolactone in 20 cc. of anhydrous benzene was added over a period of 3 hours through the dropping funnel. After the addition was completed, the mass was cooled to room temperature and agitation was continued for about 12 hours. The polymer was then filtered, treated with an aqueous sodium carbonate solution, washed with water and then with methanol and finally dried in air at 60° C. Approximately 7.4 grams of the polymer having an intrinsic viscosity of 0.28 as determined in dimethylformamide at 150° C., was obtained. The product was found to have a pivalolactone content of about 13% as determined by the infrared spectrum.

The polymer was heated to 160° C. and was found to lose approximately 10% by weight which is attributed to the low formaldehyde polymers formed during the polymerization. The remaining 90% of the product, without the addition of stabilizers, was found to have a weight loss at 222° C. of about 0.15% per minute.

EXAMPLE 3

Approximately 10 cc. of benzene and 0.1 cc. of boron trifluoride-etherate were introduced under an inert atmosphere into a flask provided with an agitator, dropping funnel and a nitrogen inlet pipe. The flask was immersed in a bath at 60° C. While agitating the mass, a solution of 10 grams of trioxane and 0.9 cc. of dimethylketene in 30 cc. of benzene was added through the dropping funnel over a period of about 1 hour. After the addition was completed, agitation was continued further for 5 hours and the polymer was then separated, washed with an aqueous sodium carbonate solution and subsequently with distilled water. Approximately 4.2 grams of the polymer were obtained after it was dried in air at 60° C. The product wast then heated to 160° C. when approximately 15% of its weight was lost with the remaining fraction losing about 0.3% per minute at 222° C. The product had an intrinsic viscosity of about 0.12 in dimethylformamide at 150° C. The dimethylketene content was approximately 6.5% by weight as determined by the infrared absorption spectrum.

EXAMPLE 4

Approximately 200 cc. of anhydrous benzene, 10 grams of trioxane which had been distilled on a sodium-potassium alloy and 0.5 cc. of beta-pivalolactone were introduced under nitrogen into a flask provided with an agitator and immersed in a bath at 60° C. As soon as the mixture was homogeneous, 0.3 cc. of a 10% by volume solution of boron trifluoride-etherate in a n-heptane was added to the mixture. After agitation for about 7 hours, the polymer was separated by filtration and washed with ammonia water. After drying under a vacuum at 60° C., approximately 8.8 grams of the product were obtained. This product had an intrinsic viscosity of 0.4 as determined with 100 cc. per gram in dimethylformamide at 135° C. The pivalolactone content of the product was about 6% as determined by infrared absorption spectrum.

EXAMPLE 5

Approximately 5 cc. of benzene and 0.3 cc. of a 10% solution of boron trifluoride-etherate in n-heptane were introduced under nitrogen into a flask provided with an agitator, dropping funnel and a nitrogen inlet pipe. The flask was immersed in a bath at 60° C. While the mixture was being agitated, a mixture of 20 cc. of anhydrous benzene, 10 cc. of trioxane and 0.7 cc. of dimethylketene was added through the dropping funnel over a period of about 30 minutes. After the addition was completed, the agitation was continued for about 6 hours. The polymer obtained was then filtered and suspended in water containing ammonia. After washing the product with methanol and drying at 60° C. in air, approximately 6.8 grams of the product was obtained. This particular product had the following characteristics:

Intrinsic viscosity _____ 0.35
Dimethylketene content (as determined by the infrared spectrum) _____percent__ 5.3
Unstable fractions _____do____ 14
* Weight loss of the stable fraction _____do____ 0.3

*At 222° C. without the addition of stabilizers.

EXAMPLE 6

About 470 g. of trioxane distilled on a sodium-potassium alloy, and 19 cc. of pivalolactone were introduced under nitrogen into a flask provided with an agitator and immersed in a bath at 70° C.

As soon as the mass was completely melted, 3.2 mg. of FeCl$_3$ dissolved in a few ml. of nitrobenzene were added.

The polymerization started quickly and after 15 minutes was stopped by adding methanol.

The polymer was filtered and washed with methanol and ammonia.

After extraction with boiling acetone 80 g. of polymer having the following characteristics were obtained:

Intrinsic viscosity _____ 0.56
Dimethylketene content (determined from the infrared spectrum) _____percent__ 1.2
Unstable fraction _____do__ 10
Weight loss at 222° C. (percent per minute) _____ 0.15

While this invention has been described with respect to a number of specific embodiments it is obvious that there are other modifications and variations which may be used without departing from the spirit of the invention except as more specifically pointed out in the appended claims.

What is claimed is:

1. A process for preparing thermo-stabilized copolymers having prevailingly polyoxymethylenic structure and having an intrinsic viscosity of between 0.12 and 0.56, as determined in dimethylformamide at 150° C. which comprises polymerizing a mixture consisting essentially of trioxane and a monomer selected from the group consisting of dimethylketene and beta-pivalolactone in the presence of a Lewis-acid catalyst selected from the group consisting of $BF_3$, $FeCl_3$, $BF_3$-etherate and $BF_3$-thioetherate.

2. The process of claim 1 further characterized in that the Lewis-acid catalyst is $BF_3$.

3. The process of claim 1 further characterized in that the Lewis-acid catalyst is a coordinated complex of $BF_3$ with an organic compound wherein the donor atom is selected from the group consisting of oxygen and sulfur.

4. The process of claim 3 further characterized in that the catalyst is a $BF_3$-etherate.

5. The process of claim 3 further characterized in that the catalyst is $FeCl_3$.

6. The process of claim 1 further characterized in that the mixture is trioxane and dimethylketene, wherein 0.01 to 20% by moles of the mixture is the dimethylketene.

7. The process of claim 1 further characterized in that the mixture is trioxane and the addition product of dimethylketene with formaldehyde, wherein the trioxane and addition product is present in the mixture in a ratio of 10 to 1000.

8. The process of claim 1 further characterized in that the polymerization mixture contains an organic solvent selected from the group consisting of cyclohexane, benzene and methylene chloride.

9. The process of claim 1 further characterized in that the polymerization is carried out at a temperature ranging from about 0° to 110° C.

10. A thermostabilized copolymer having a prevailingly polyoxymethylenic structure and consisting of macromolecules made up of randomly distributed, polymerized units having the formulae (a) —CH₂—O—
(b) 

said units being present in the copolymer in the ratio of from 6:1 to 1000:1, said copolymer having an intrinsic viscosity, as determined in dimethylformamide at 150° C., of from 0.12 to 0.56 and being prepared by polymerizing a monomer mixture consisting essentially of trioxane and of a monomer selected from the group consisting of dimethylketene and beta-pivalolactone, with the aid of a Lewis-acid catalyst selected from the group consisting of $BF_3$, $FeCl_3$, $BF_3$-etherate and $BF_3$-thioetherate, the molar ratio between trioxane and said other monomer in the monomer mixture being of from 10:1 to 1000:1.

11. The copolymers of claim 10 further characterized as consisting of oxymethylenic and dimethylketene units having a melting point ranging from 150° C. to 175° C.

References Cited

UNITED STATES PATENTS

| | | | |
|---|---|---|---|
| 2,356,459 | 8/1944 | Kung | 260—344 |
| 2,361,036 | 10/1944 | Kung | 260—526 |
| 2,487,885 | 11/1949 | Magoffin et al. | 260—63 |
| 3,021,310 | 2/1962 | Cox et al. | 260—78.3 |
| 3,026,299 | 3/1962 | Kray et al. | 260—67 |

FOREIGN PATENTS 582,454  12/1959  Belgium.

OTHER REFERENCES

Bevington: British Plastics, vol. 35, No. 2 (February 1962), pp. 75–79.

WILLIAM H. SHORT, *Primary Examiner.*

L. M. MILLER, *Assistant Examiner.*